United States Patent
Imai

(10) Patent No.: US 6,622,564 B2
(45) Date of Patent: Sep. 23, 2003

(54) PRESSURE SENSOR WITH FLUID PASSAGE AND PRESSURE RECEIVING SURFACE PROTRUDING THEREIN

(75) Inventor: Hiroshi Imai, Gyoda (JP)

(73) Assignee: Surpass Industry Co., Ltd., Saitama-Ken (JP)

(*) Notice: Subject to any disclaimer, the term of this patent is extended or adjusted under 35 U.S.C. 154(b) by 0 days.

(21) Appl. No.: 09/984,390

(22) Filed: Oct. 30, 2001

(65) Prior Publication Data
US 2002/0059833 A1 May 23, 2002

(30) Foreign Application Priority Data
Nov. 17, 2000 (JP) ........................................ 2000-350755

(51) Int. Cl.⁷ ................................................ G01L 7/08
(52) U.S. Cl. ........................... 73/715; 73/700; 73/706; 73/718; 73/727; 73/756
(58) Field of Search ........................... 73/715–727, 706, 73/708, 756, 861.42, 700

(56) References Cited

U.S. PATENT DOCUMENTS

| | | | |
|---|---|---|---|
| 4,177,496 A | * | 12/1979 | Bell et al. ................... 73/724 |
| 4,192,192 A | * | 3/1980 | Schnell ....................... 73/715 |
| 5,316,261 A | * | 5/1994 | Stoner ........................ 251/5 |
| 5,672,832 A | * | 9/1997 | Cucci et al. ................. 73/861.52 |
| 5,693,887 A | | 12/1997 | Englund et al. .............. 73/723 |
| 5,852,244 A | | 12/1998 | Englund et al. .............. 73/706 |
| 5,869,766 A | * | 2/1999 | Cucci et al. ................. 73/715 |

FOREIGN PATENT DOCUMENTS

WO    97/13132    4/1997    ............. G01L/9/00

* cited by examiner

Primary Examiner—Edward Lefkowitz
Assistant Examiner—Alandra N. Ellington
(74) Attorney, Agent, or Firm—Sughrue Mion, PLLC

(57) ABSTRACT

A pressure sensor is provided, in which dead space is not formed under the diaphragm so that air or fluid will not be remained in the dead space. The pressure sensor having a passage for flowing fluid from one end to the other end thereof comprises a sensor head having a pressure sensitive area responsive to the fluid pressure and a diaphragm having a pressure receiving surface for receiving the fluid pressure directly, wherein the pressure receiving surface is disposed so as to protrude to the inside of the passage, and the pressure sensitive area is disposed on the opposite surface from the pressure receiving surface of the diaphragm.

12 Claims, 3 Drawing Sheets

PRESSURE SENSOR WITH FLUID PASSAGE AND PRESSURE RECEIVING SURFACE PROTRUDING THEREIN

TECHNICAL FIELD

The present invention relates to a pressure sensor which detects a fluid pressure. More particularly, it relates a pressure sensor which detects pressure of various types of gas or chemical, such as chemicals used for a semiconductor producing process.

BACKGROUND ART

A conventional pressure sensor will be explained in the following.

The conventional pressure sensor has a conduit which constitutes a passage for flowing a fluid, such as chemical, from one end to the other end thereof. Small space (dead space) is formed on the part of the passage, and a thin diaphragm for receiving fluid pressure directly is disposed above the dead space.

A sensor head is disposed on the diaphragm and has a pressure sensitive area responsive to the fluid pressure. The pressure sensitive area contacts the diaphragm. The pressure sensitive area of the sensor head is positioned on the passage via the dead space and the diaphragm. In such a structure, the pressure in the passage is transmitted to the pressure sensitive area of the sensor head via the fluid, which is trapped in the dead space, and then the diaphragm.

When the pressure sensor is used, both ends of the conduit are first connected to a piping for flowing fluid such as chemicals. And then, when the fluid is flowed through the passage, the fluid is trapped in the dead space. The fluid pressure is transmitted to the diaphragm via the trapped fluid and then the pressure acting on the diaphragm is detected by the pressure sensitive area of the sensor head.

PROBLEMS TO BE SOLVED BY THE INVENTION

In the conventional pressure sensor, since the dead space is formed on the part of the passage and the diaphragm is disposed above such the dead space, air or fluid may be remained in the dead space when the fluid is flowed through the passage. Accordingly, the dead space should be eliminated and a pressure sensor without dead space is required.

In view of the problems, the object of the present invention is to provide a pressure sensor in which dead space is not formed under the diaphragm so that air or fluid is not remained in the sensor.

MEANS FOR SOLVING THE PROBLEMS

In order to solve the problems, the present invention provides a pressure sensor, having a passage for flowing fluid from one end to the other end thereof, comprises a sensor head having a pressure sensitive area responsive to the fluid pressure, and a diaphragm having a pressure receiving surface for receiving the fluid pressure directly, wherein said pressure receiving surface is disposed so as to protrude to the inside of the passage, and said pressure sensitive area is disposed on the opposite surface from the pressure receiving surface of the diaphragm.

Here, the fluid means both gas and liquid.

In said pressure sensor, since the pressure receiving surface is disposed so as to protrude into the inside of the passage, dead space will not be formed under the diaphragm. In this structure, air and fluid will not be remained in the sensor.

And, in said pressure sensor according to the present invention, the sensor head may be covered with the diaphragm.

And, in said pressure sensor according to the present invention, it is preferred that an air hole for escaping air near the sensor head to the outside is formed at the diaphragm. In this manner, the fluid pressure will be detected accurately.

And, in said pressure sensor according to the present invention, it is preferred that the fluid pressure in the passage is transmitted to the pressure sensitive area via the pressure receiving surface.

And, said pressure sensor according to the present invention may further comprise a conduit which constructs the passage.

And, said pressure sensor according to the present invention may further comprise a body which is integrally formed with the conduit.

And, in said pressure sensor according to the present invention, it is preferred that the body has a through bore which communicates with the passage, the trough bore being provided with the diaphragm and the sensor head.

And, in said pressure sensor according to the present invention, it is preferred that the conduit is connected to a piping for flowing a fluid at both ends thereof.

And, in said pressure sensor according to the present invention, it is preferred that the diaphragm is made of fluororesin.

DETAILED DESCRIPTION OF THE INVENTION

Figure 1:
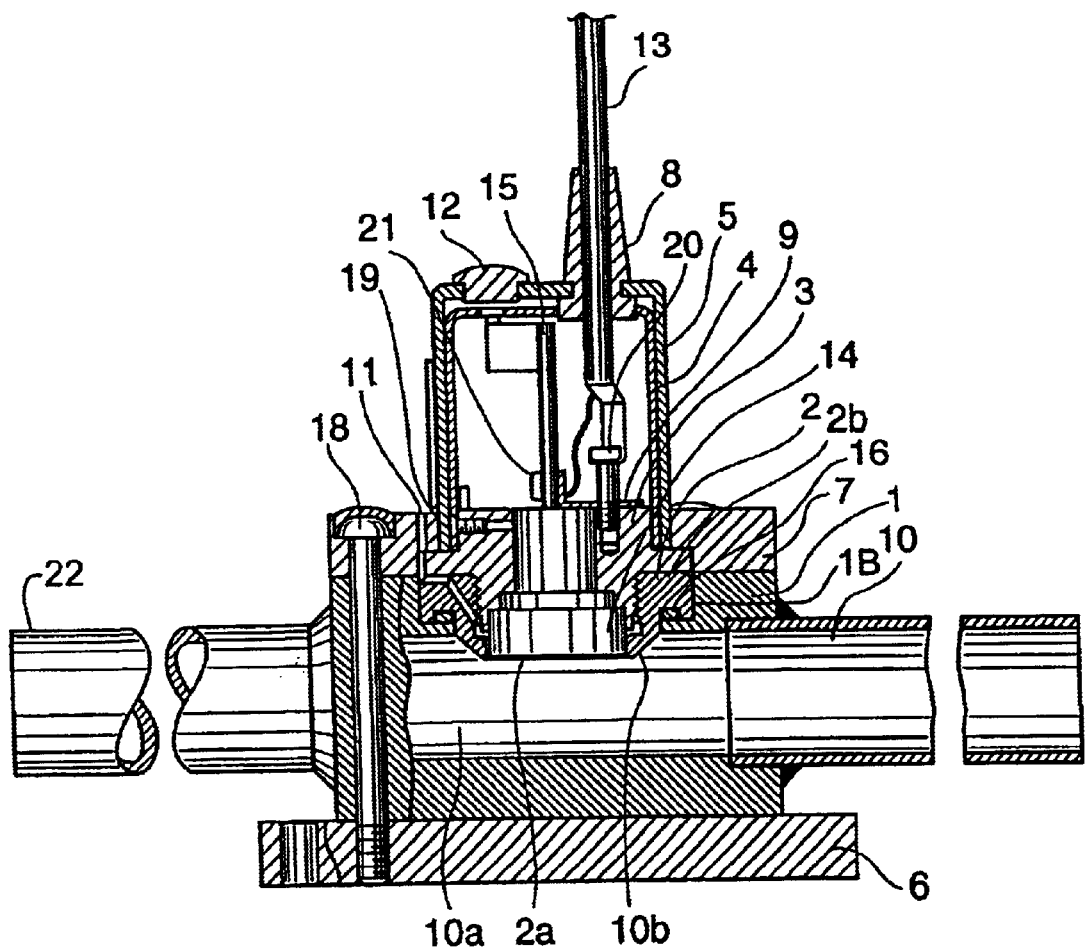
FIG. 1 is a sectional drawing showing a pressure sensor according to the present invention.

Referring to the drawings, specific examples of the present invention will be explained.

Figure 2:
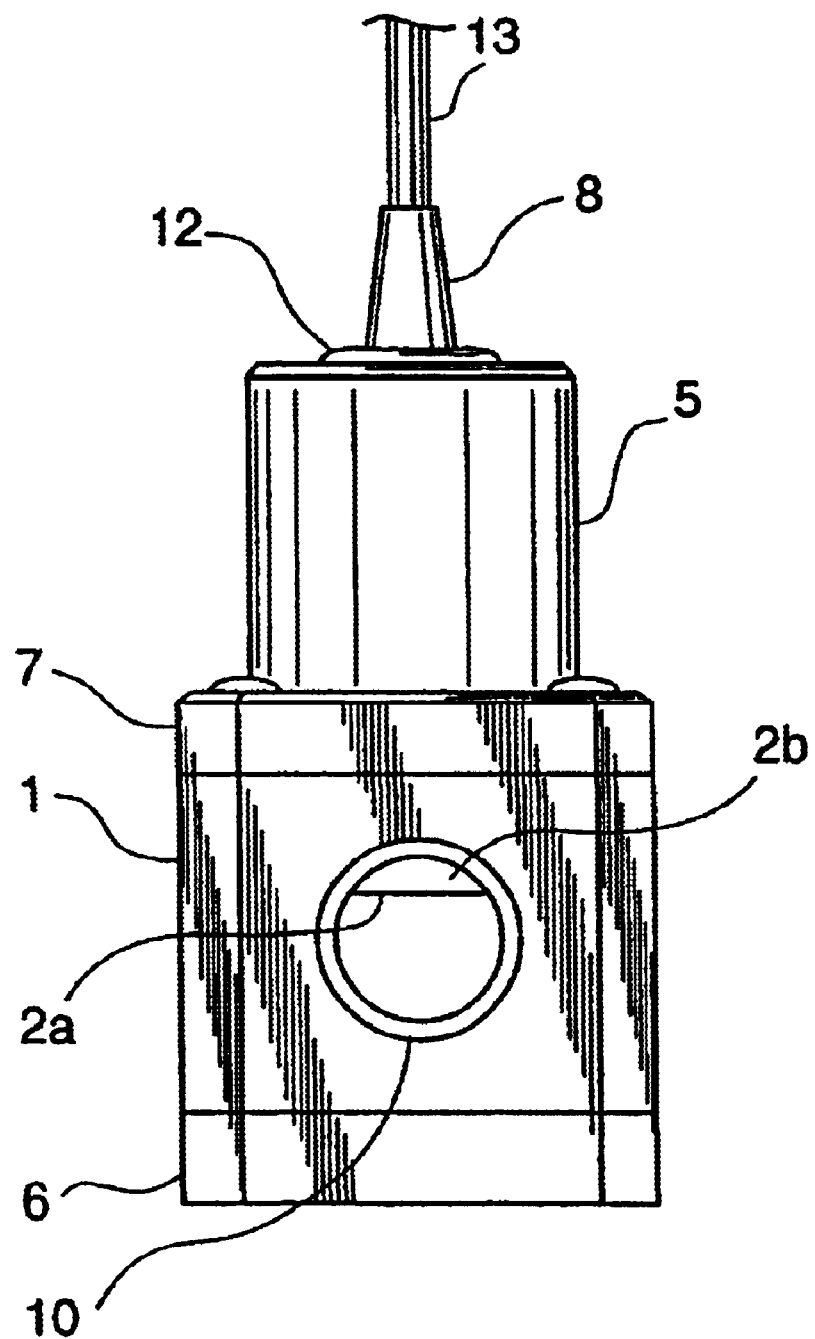
FIG. 2 is a side drawing showing the pressure sensor shown in FIG. 1.
Figure 3A:
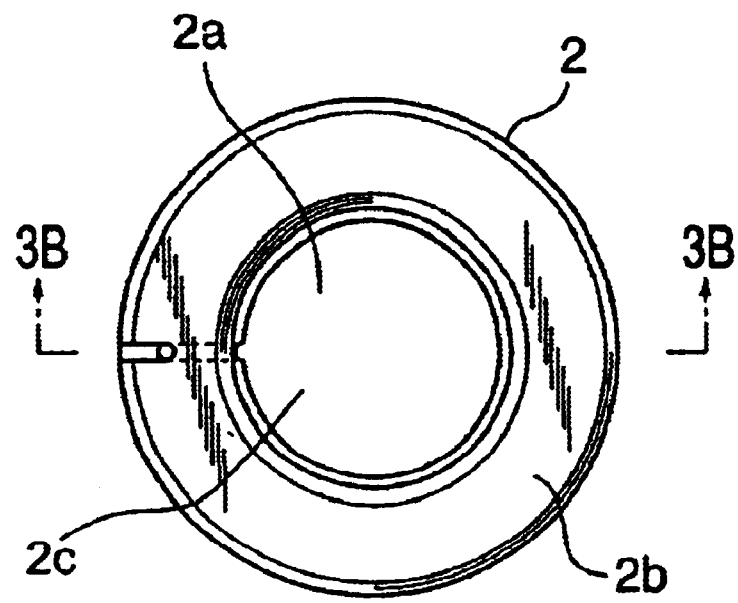
FIG. 3(A) is a plane drawing showing the diaphragm shown in FIG. 1
Figure 3B:
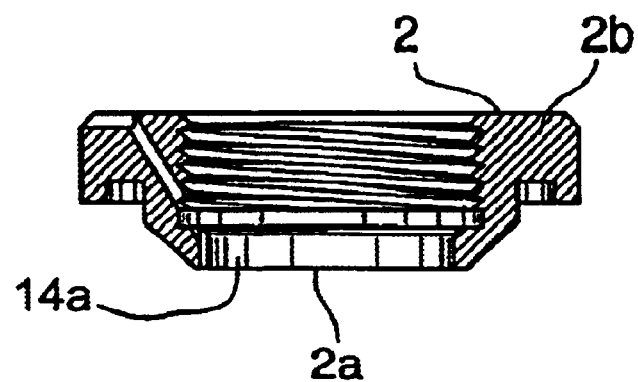
FIG. 3(B) is a sectional drawing along a line 12b—12b shown in FIG. 3(A).

FIG. 1 is a sectional drawing showing a pressure sensor according to the present invention. FIG. 2 is a side drawing showing the pressure sensor shown in FIG. 1. FIG. 3(A) is a plane drawing showing a diaphragm shown in FIG. 1 and FIG. 3(B) is a sectional drawing along a line 12b—12b shown in FIG. 3(A).

As shown in FIG. 1 and FIG. 2, the pressure sensor has a conduit 10 which constitutes a passage 10a for flowing fluid (for example, chemicals) from one end to the other end thereof. The conduit 10 is integrally formed with a body 1 (a housing) made by Teflon (fluororesin). That is, the passage 10a is composed of the body 1 and the conduit 10. The inner wall of the passage 10a is made of any material having chemical resistance.

The body 1 has a concave portion 10b on the middle portion thereof and the concave portion 10b is communicated with the passage 10a. A diaphragm 2 made by Teflon (fluororesin) is disposed in the concave portion 10b. The diaphragm 2 has a chemical resistive property. As shown in FIGS. 3(A) and (B), the diaphragm 2 has a thin wall portion 2a having a pressure receiving surface 2c for receiving the fluid pressure directly and a cover portion 2b for covering a sensor head 14.

The diaphragm 2 is shaped like a cup. That is, the thin wall portion 2a is shaped like a thin disk, and the cover portion 2b has an inclined wall on the surround of the thin wall portion 2a. In such a structure, when the sensor head 14 is mounted on the thin wall portion 2a, it is covered with the cover portion 2b.

The pressure receiving surface of the thin wall portion 2a is positioned so as to protrude into the inside of the passage 10a, as shown in FIG. 1 and FIG. 2.

The pressure sensitive area 14a responsive to the fluid pressure is formed at the sensor head 14 while being disposed so as to contact to the thin wall portion 2a. The pressure sensitive area 14a of the sensor head is positioned in the passage 10a via the thin wall portion 2a and composed such that the fluid pressure in the passage can be transmitted via the thin wall portion 2a.

A sensor holder 3 is disposed on the sensor head 14 to fix the sensor head 14 to the inside of the body 1. An O-ring 16 is disposed between the body 1 and the cover portion 2b of the diaphragm 2 and isolates the sensor head 14 from being exposed to the fluid that flows through the passage 10a.

The sensor holder 3 and the body 1 are placed between an upper plate 7 and a lower plate 6. The upper plate 7, the body 1 and the lower plate 6 are fixed together by a screw 18. A base bracket 9 is fixed to the sensor holder 3 by a screw 20. One end of a cable 13 is electrically connected to a base 15. The base 15 is fixed to the base bracket by a screw 21.

The base 15 is covered with a shield case 4, which is covered with a body cap 5. The shield case 4 is fixed to the sensor holder 3 by a screw 19. The upper portion of the body cap 5 is covered by a cap 12. A cable guard 8 is mounted at the upper portion of the body cap 5 and covers the other end of the cable 13 extending from the body cap 5 to the outside for protection.

An air hole 11 is formed at the sensor holder 3 and the cover portion 2b so that air near the sensor head 14 can escape to the outside. In this manner, the fluid pressure can be detected accurately.

When the pressure sensor is used, firstly, both end of the conduit 10 is connected to a piping for flowing fluid, such as chemical, and then the fluid is flowed through the passage. Consequently, the fluid pressure is transmitted to the pressure receiving surface of the thin wall portion 2a of the diaphragm 2, and then the pressure acting on the pressure receiving surface is detected by the pressure sensitive area of the sensor head 14 via the thin wall portion.

In one aspect of the pressure sensor according to the present invention, the body 1 has the concave portion 10b which is formed in the nature of a bore and is communicated with the passage. And, the diaphragm 2 is disposed in the concave portion so that the pressure receiving surface of the thin wall portion 2a of the diaphragm is protruded to the inside of the passage 10a. In this structure, dead space, as shown in a conventional pressure sensor, might not be formed under the thin wall portion 2a. So, air and fluid will not be remained in the sensor. Accordingly, the fluid pressure in the passage will be accurately detected by the pressure receiving surface and then transmitted to the pressure sensitive area of the sensor head 14, thereby improving the accuracy of the pressure sensor.

This invention is not limited to the embodiment, and it is possible to carry out in various aspects within not deviating from the sprit. For example, the material of the various members can be changed to a suitable one.

In the aspect, the sensor head 14 is covered with the cover portion 2b of the diaphragm 2. However, as long as the diaphragm 2 has the thin wall portion 2a which makes a pressure receiving surface, it dose not need to have the cover portion for covering the sensor head 14. Accordingly, a pressure sensor which dose not have a cover portion for covering the sensor head 14 can be also provided.

EFFECT OF THE INVENTION

As mentioned above, according to the present invention, the pressure receiving surface of the diaphragm is disposed so as to protrude to the inside of the passage. Accordingly, the dead space is not formed under the diaphragm, thereby preventing air and fluid from being remained in the sensor.

I claim:

1. A pressure sensor having a passage for flowing fluid from one end to the other end thereof, comprising,
    a sensor head having a pressure sensitive area responsive to the fluid pressure, and,
    a diaphragm having a pressure receiving surface for receiving a fluid pressure directly,
    wherein said pressure receiving surface is disposed so as to protrude into the inside of the passage and said pressure sensitive area is disposed on an opposite surface from the pressure receiving surface of the diaphragm.

2. The pressure sensor according to claim 1, wherein said sensor head is covered with the diaphragm.

3. The pressure sensor according to claim 2, wherein an air hole for escaping air near the sensor head to the outside is formed at said diaphragm.

4. The pressure sensor according to claim 1, wherein the fluid pressure in the passage is transmitted to said pressure sensitive area via said pressure receiving surface.

5. The pressure sensor according to claim 2, further comprising a conduit which constructs said passage.

6. The pressure sensor according to claim 5, further comprising a body which is integrally formed with said conduit.

7. The pressure sensor according to claim 6, wherein said body has a through bore which communicates with the passage, the through bore being adapted to receive said diaphragm and said sensor head.

8. The pressure sensor according to claim 5, wherein said conduit is connected to a piping for flowing a fluid at both ends thereof.

9. The pressure sensor according to claim 1, wherein said diaphragm is made of fluororesin.

10. The pressure sensor according to claim 1, wherein said diaphragm comprises a first portion for transmitting pressure applied to said pressure receiving surface, and a second portion for receiving at least a portion of said sensor head and sealing against fluid from said passage.

11. The pressure sensor according to claim 10, wherein said passage has a concave portion through which said first portion of said diaphragm projects and a said diaphragm second portion is shaped to seal said concave portion against fluid from said passage.

12. The pressure sensor according to claim 11, further comprising a sensor holder with a threaded surface, wherein said diaphragm second portion comprises a threaded portion for engaging the threaded portion on said sensor holder.

* * * * *